(12) United States Patent  
Forster

(10) Patent No.: US 9,239,942 B2  
(45) Date of Patent: Jan. 19, 2016

(54) APPARATUS, SYSTEM AND METHOD FOR EXTENDING THE FIELD AREA OF A DEVICE EQUIPPED WITH A HIGH-FREQUENCY READER

(75) Inventor: Ian J. Forster, Essex (GB)

(73) Assignee: Avery Dennison Corporation, Glendale, CA (US)

(*) Notice: Subject to any disclaimer, the term of this patent is extended or adjusted under 35 U.S.C. 154(b) by 101 days.

(21) Appl. No.: 13/552,759

(22) Filed: Jul. 19, 2012

(65) Prior Publication Data

US 2013/0021140 A1    Jan. 24, 2013

Related U.S. Application Data

(60) Provisional application No. 61/510,623, filed on Jul. 22, 2011.

(51) Int. Cl.  
*G06K 7/10* (2006.01)  
*G08B 13/14* (2006.01)  
*G06K 19/07* (2006.01)  
*G06K 19/077* (2006.01)

(52) U.S. Cl.  
CPC ...... *G06K 7/10178* (2013.01); *G06K 19/07794* (2013.01); *G08B 13/14* (2013.01)

(58) Field of Classification Search  
CPC .................. G06K 7/10178; G06K 19/07794; G08B 13/14

USPC ............. 340/10.1, 3.51, 4.5, 4.51, 5.61, 7.21, 340/505, 572.1, 870.28; 235/375–386; 342/42–51; 455/41.1, 106  
See application file for complete search history.

(56) References Cited

U.S. PATENT DOCUMENTS

| | | | |
|---|---|---|---|
| 6,144,264 A * | 11/2000 | Wen | 331/96 |
| 6,838,989 B1 * | 1/2005 | Mays et al. | 340/572.1 |
| 6,839,035 B1 * | 1/2005 | Addonisio et al. | 343/742 |
| 7,084,769 B2 * | 8/2006 | Bauer et al. | 340/572.7 |
| 7,477,152 B2 * | 1/2009 | Forster | 340/572.8 |
| 7,876,101 B2 * | 1/2011 | Lee | 324/322 |
| 7,961,097 B2 * | 6/2011 | Porte et al. | 340/572.1 |
| 2004/0012486 A1 * | 1/2004 | Mani | 340/10.2 |
| 2007/0008140 A1 * | 1/2007 | Saarisalo et al. | 340/572.7 |
| 2008/0117047 A1 * | 5/2008 | Collins et al. | 340/572.1 |
| 2009/0085746 A1 * | 4/2009 | Erickson et al. | 340/572.1 |

* cited by examiner

*Primary Examiner* — Omar Casillashernandez  
(74) *Attorney, Agent, or Firm* — Avery Dennison Retail Information Services, LLC

(57) ABSTRACT

A structure for extending the field area of a device equipped with an RF tag reader. The structure can include at least one reader coupling area for inductively coupling with an RF tag reader, and at least one tag coupling area for inductively coupling with an RF tag, wherein the tag coupling area is disposed outside the field area of the RF tag reader, and the reader coupling area is conductively coupled to the tag coupling area such that a signal induced in the reader coupling area by the RF reader creates a signal in the tag coupling area, thereby inducing a signal in the tag, and allowing the RF reader to communicate with the tag.

17 Claims, 5 Drawing Sheets

APPARATUS, SYSTEM AND METHOD FOR EXTENDING THE FIELD AREA OF A DEVICE EQUIPPED WITH A HIGH-FREQUENCY READER

CROSS-REFERENCE TO RELATED APPLICATIONS

The present application claims the benefit of U.S. Provisional Patent Application No. 61/510,623 filed Jul. 22, 2011, which is incorporated herein by reference in its entirety.

BACKGROUND

The use of radio frequency identification (RFID) tags to track, identify and locate goods has grown significantly in recent years. RFID tags allow manufacturers, distributors and retailers, amongst others, to regulate products and inventory, quickly determine production, manufacture, distribution or retail needs and efficiently intake and outtake items utilizing RFID tags. The RFID tags themselves can provide any desired product data and may be scanned or read in any of a variety of manners.

Near-field communication (NFC) is a type of radio frequency communication technology, operating at about 13.56 MHz and at bandwidth of about 2 MHz, that allows for read-only and read-write communications between an NFC-enabled RF tag reader and an NFC-enabled tag. NFC operation is based on inductive coupling between two loop antennas, which allows for sharing of power and data between NFC-enabled devices. Typically, for proper operation, the distance between an NEC-enabled reader and an NFC-enabled tag needs to be under 20 centimeters, while typical RFID tag operating ranges can extend out to several meters, depending on tag configuration and reader power.

In certain applications, for example inventory management, retail display monitoring, medical compliance monitoring, and the like, it is desirable to obtain information about individual items within a group of items, or to determine the presence or absence of individual items within the group of items. For example, the items may be arranged on a shelf in multiple column and row arrays. While RFID technology can be convenient for such uses, NFC-enabled readers can only communicate with tags within the operational range. Information from tags that are located outside the operational range of the reader cannot, therefore, be obtained. A solution that allows an RF tag reader to obtain information from tags outside the operational range of the reader is therefore desired.

SUMMARY

According to at least one exemplary embodiment, a structure for extending the field area of a device equipped with an RF tag reader is disclosed. The structure can include at least one reader coupling area for inductively coupling with an RF tag reader, and at least one tag coupling area for inductively coupling with an RF tag, wherein the tag coupling area is disposed outside the field area of the RF tag reader, and the reader coupling area is conductively coupled to the tag coupling area such that a signal induced in the reader coupling area by the RF reader creates a signal in the tag coupling area, thereby inducing a signal in the tag, and allowing the RF reader to communicate with the tag.

According to another exemplary embodiment, a system for extending the field area of a device equipped with an RF tag reader is disclosed. The system can include a surface, and at least one structure for extending the field area of a device equipped with an RF tag reader. The structure can include at least one reader coupling area for inductively coupling with an RF tag reader, the at least one reader coupling area being conductively coupled to at least one tag coupling area for inductively coupling with an RF tag. The structure can be disposed within the surface.

According to another exemplary embodiment, a method for reading RF tags outside the field area of a device equipped with an RF tag reader is disclosed. The method can include providing at least one RF tag reader coupling area, providing at least one RF tag coupling area conductively coupled to the at least one reader coupling area, inducing a signal in the reader coupling area by the RF tag reader, creating the signal in the tag coupling area, and inducing the signal in the tag.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Generally referring to FIGS. 1-5b, an apparatus, system and method for extending the field area of an RF tag reader equipped device, for example an NFC-enabled RF tag reader, may be disclosed.

Figure 1:
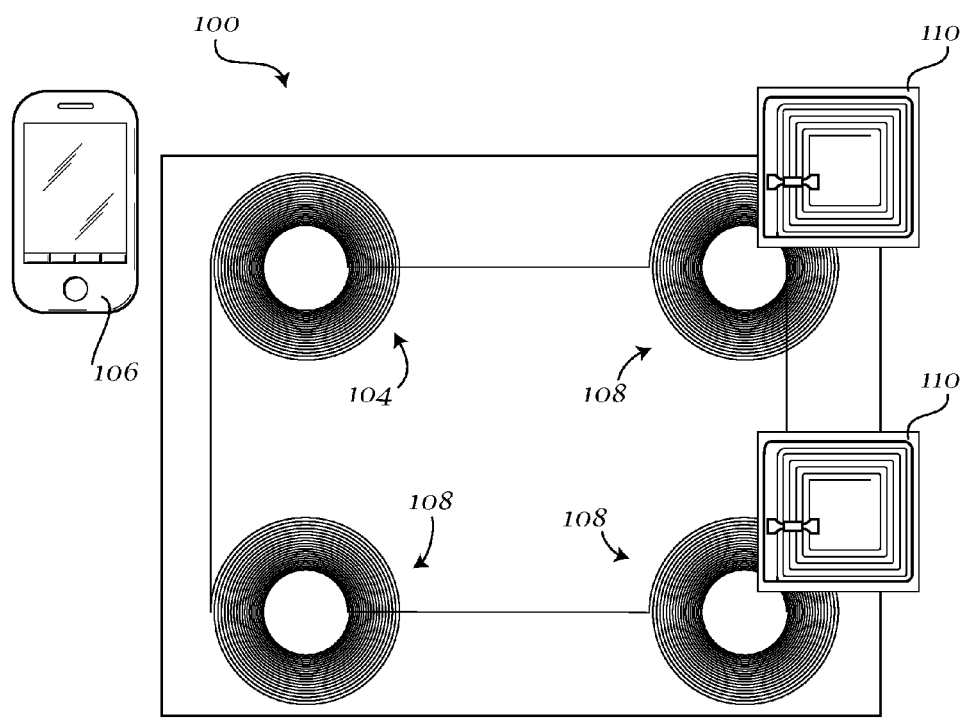
FIG. 1 shows an exemplary embodiment of a structure for extending the field area of an RF tag reader equipped device.

As shown in FIG. 1, one embodiment may include a structure 100 for extending the field area of an RF tag reader equipped device. Structure 100 may be formed from a conductive material. Structure 100 can include at least one reader coupling area 104 that is tuned to inductively couple with an external RF tag reader 106. Reader coupling area 104 may be, for example, a coil of the conductive material of structure 100. RF tag reader 106 may be an RFID reader, an NFC-enabled RF tag reader, or a device equipped with RFID or NFC capabilities, such as a mobile communications device, which may have a built in RFID reader or NFC-enabled RF tag reader. RF tag reader 106 may further be a short range reader operating at a low frequency.

Structure 100 can further include a plurality of tag coupling areas 108 that are tuned to inductively couple with tags 110. Each of tags 110 may be an RFID tag, an NFC-enabled tag, or any other RF-readable tag known in the art. Tag coupling areas 108 may be positioned at a distance exceeding the range of RF tag reader 106. Tag coupling areas 106 may be, for example, coils of the conductive material of structure 100. Tag coupling areas 108 may be conductively coupled to each other via the conductive material of structure 100, and may further be conductively coupled to reader coupling area 104 via the conductive material of structure 100. Structure 100 may further form a closed loop with coupling areas 104, 108 arranged in series, substantially as shown in FIG. 1. However, it should be appreciated that structure 100 may have any desired size, configuration, or layout and may include any desired quantity of tag coupling areas 108.

In operation, an RF tag reader 106 can be placed proximate to reader coupling area 104 such that area 104 is within the operating range of RF tag reader 106. RF tag reader 106 can generate a modulated carrier signal, inducing a signal in reader coupling area 104. It will be appreciated that the nature of the carrier signal emitted and how it interacts with the coupling area depends on factors such as frequency, antenna design and distance. In the case of a reader operating according to the Near Field Communications standard, the operating frequency is in the region of 13.56 MHz and the emitted carrier is primarily a magnetic field. The signal is the propagated through structure 100, and to tag coupling areas 108. The signal in tag coupling areas 108 can then induce a current in tags 110, allowing tags 110 to be read by RF tag reader 106.

In some embodiments, the signal may be spread out over a general area, for example the general area of structure 100 or any other desired area, rather than just the specific tag coupling areas 108. Furthermore, in some embodiments, structure 100 may include amplification devices for amplifying the signal between RF tag reader 106 and tag coupling areas 108.

Figure 2:
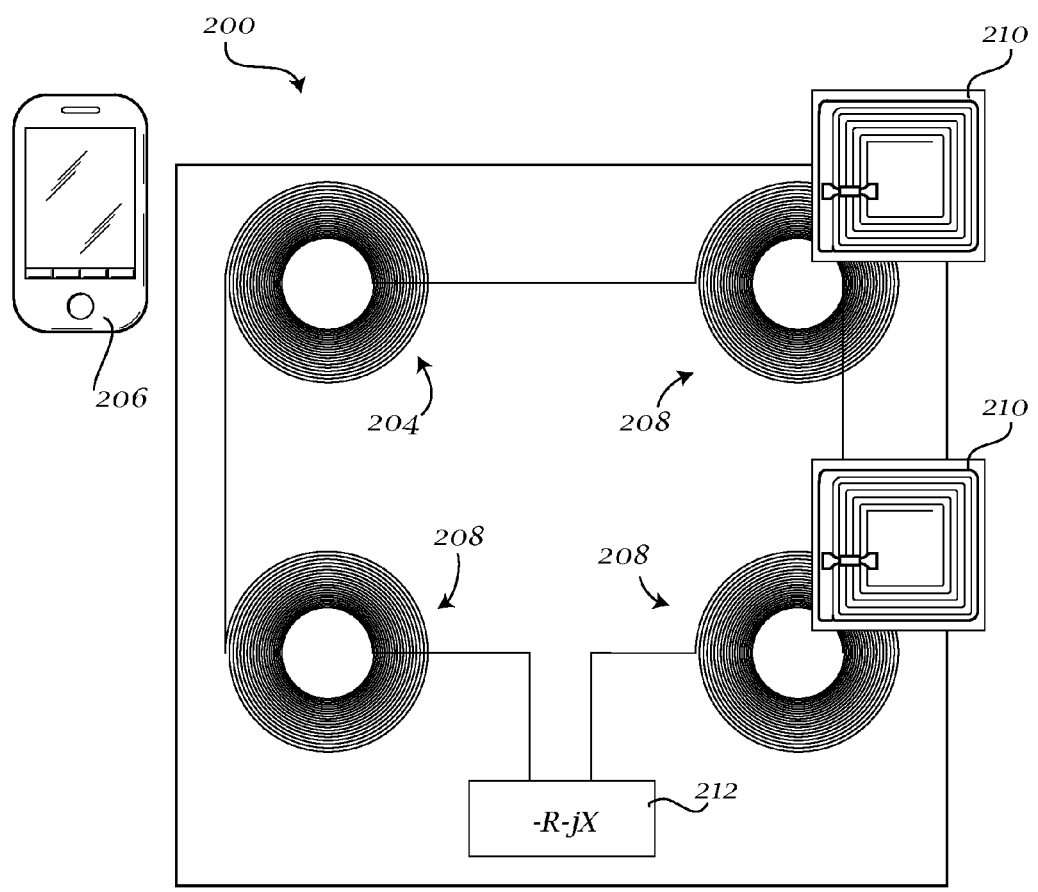
FIG. 2 shows another exemplary embodiment of a structure for extending the field area of an RF tag reader equipped device.

FIG. 2 shows another exemplary embodiment of a structure 200 for extending the field area of an RF tag reader equipped device. Structure 200 may be formed from a conductive material. Structure 200 can include at least one reader coupling area 204 that is tuned to inductively couple with an external RF tag reader 206. Reader coupling area 204 may be, for example, a coil of the conductive material of structure 200. Structure 200 can further include a plurality of tag coupling areas 208 that are tuned to inductively couple with tags 210. Tag coupling areas 208 may be positioned at a distance exceeding the range of RF tag reader 206. Tag coupling areas 206 may be, for example, coils of the conductive material of structure 200. Tag coupling areas 208 may be connected to each other via the conductive material of structure 200, and may further be connected to reader coupling area 204 via the conductive material of structure 200. Structure 200 may further form a closed loop with coupling areas 204, 208 arranged in series, substantially as shown in FIG. 2. However, it should be appreciated that structure 200 may have any desired size, configuration, or layout and may include any desired quantity of tag coupling areas 208.

Structure 200 can further include a negative resistance 212 conductively coupled thereto and arranged in series with the other elements of structure 200. Negative resistance 212 can serve to provide a bi-directional amplification for a particular range of frequencies of the coupled signal. To that end, the capacitive negative reactance of negative resistance 212 can be tuned such that it resonates with the total inductance of structure 200. Furthermore, the negative resistance 212 may be set to a level that can prevent oscillation of the signal in structure 200, for example by setting negative resistance 212 to a level that is lower than the resistance of the coupling areas 204, 208, or by arranging the phase so that the likelihood of oscillation is reduced.

In one embodiment, negative resistance 212 may be implemented through the use of a high-frequency operational amplifier. In an alternate embodiment, the negative resistance may be implemented through the use of a transistor.

Figure 3:
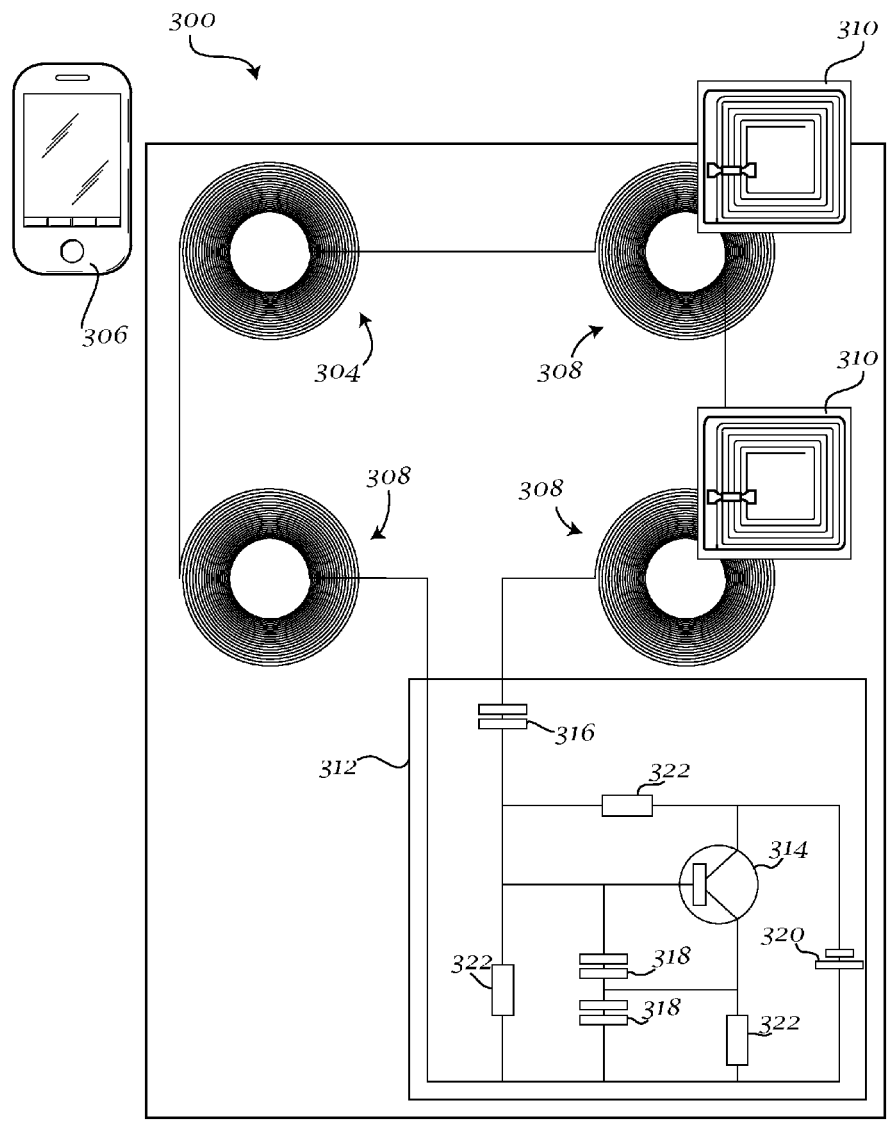
FIG. 3 shows another exemplary embodiment of a structure for extending the field area of an RF tag reader equipped device.

FIG. 3 shows another exemplary embodiment of a structure 300 for extending the field area of an RF tag reader equipped device. Structure 300 may be formed from a conductive material. Structure 300 can include at least one reader coupling area 304 that is tuned to inductively couple with an external RF tag reader 306. Reader coupling area 304 may be, for example, a coil of the conductive material of structure 300. Structure 300 can further include a plurality of tag coupling areas 308 that are tuned to inductively couple with tags 310. Tag coupling areas 308 may be positioned at a distance exceeding the range of RF tag reader 306. Tag coupling areas 306 may be, for example, coils of the conductive material of structure 300. Tag coupling areas 308 may be connected to each other via the conductive material of structure 300, and may further be connected to reader coupling area 304 via the conductive material of structure 300. Structure 300 may further form a closed loop with coupling areas 304, 308 arranged in series, substantially as shown in FIG. 3. However, it should be appreciated that structure 300 may have any desired size, configuration, or layout and may include any desired quantity of tag coupling areas 308.

Structure 300 can further include a negative resistance 312 conductively coupled thereto and arranged in series with the other elements of structure 300. Substantially as shown in FIG. 3, negative resistance 312 may include a circuit having a transistor 314, direct current block 316, feedback capacitors 318, a power source 320 and a plurality of resistors 322. Power source 320 may be any desired DC power source. For example, power source 320 may be a battery having a voltage of 1.5V, or any other desired voltage. In some embodiments, transistor 314 may include a DC bias. The bias of the transistor may be set such that the current draw by the transistor is minimized when there is no signal received from RF tag reader 306, and such that the current draw increases when a signal is received from RF tag reader 306. Such a configuration can allow negative resistance 312 to operate as a non-linear Class C signal amplifier.

Figure 4:
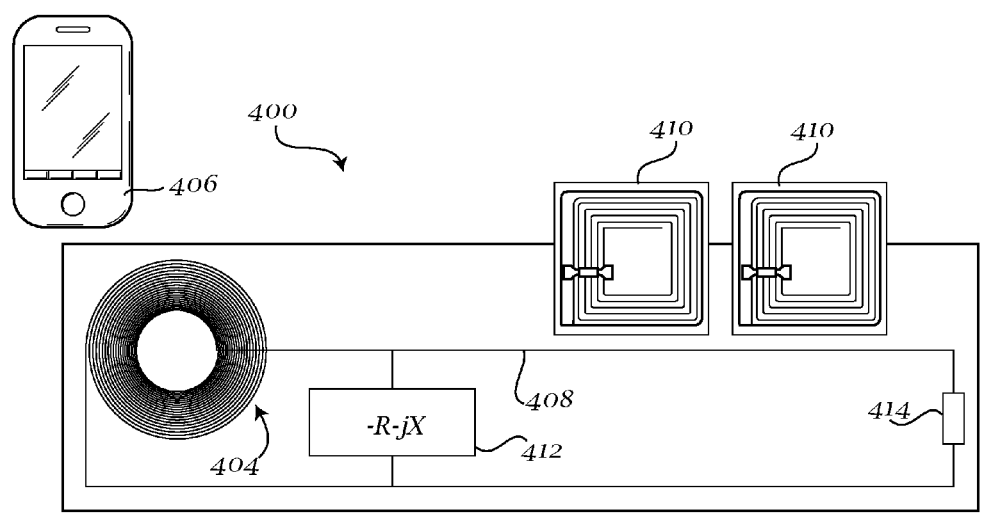
FIG. 4 shows another exemplary embodiment of a structure for extending the field area of an RF tag reader equipped device.

FIG. 4 shows another exemplary embodiment of a structure 400 for extending the field area of an RF tag reader equipped device. Structure 400 may be formed from a conductive material. Structure 400 can include at least one reader coupling area 404 that is tuned to inductively couple with an external RF tag reader 406. Reader coupling area 404 may be, for example, a coil of the conductive material of structure 400. Structure 400 can further include a transmission line 408 conductively coupled to reader coupling area 404. Transmission line 408 may be, as a non-limiting example, a two-wire transmission line. Additionally, in some embodiments, transmission line 408 can have an impedance that is less than 50 ohms. Transmission line can further terminate in a resistor 414, with resistor 414 having a resistance approximately equal to the impedance of transmission line 408. The signal induced in reader coupling area 404 can be propagated along transmission line 408, thereby inducing a current in tags 110 arranged along transmission line 408, allowing tags 110 to be read by RF tag reader 106.

Structure 400 can further include at least one negative resistance 412, which may be implemented by the methods and structures described for negative resistances 212 and 312. Additional negative resistances 412 may be used as desired, with power for the negative resistances 412 being distributed over transmission line 408.

Figure 5A:
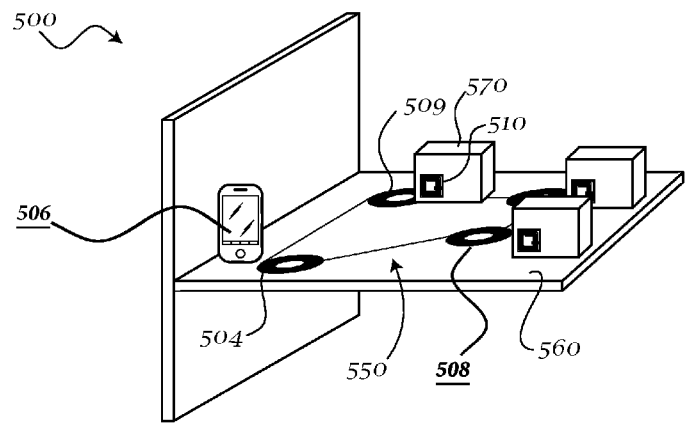
FIGS. 5a-5c show exemplary embodiments of a system for extending the field area of an RF tag reader equipped device.
Figure 5B:
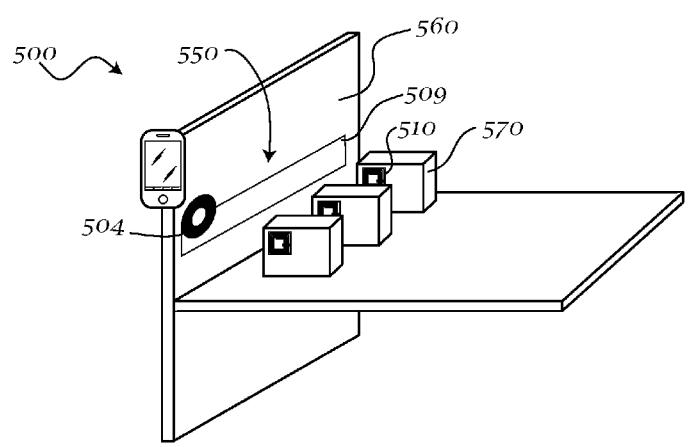
Figure 5C:
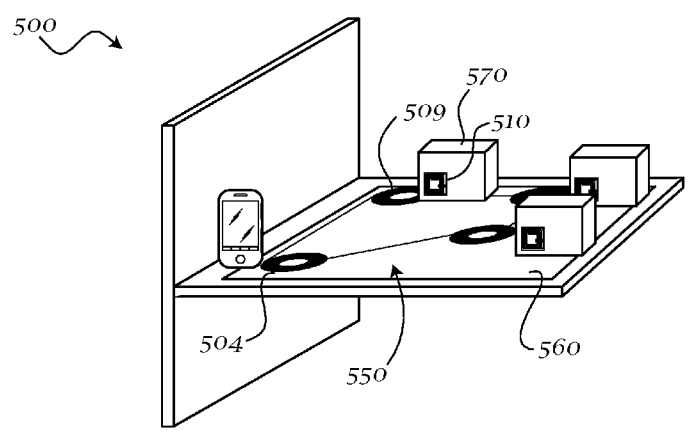

FIGS. 5a-5c show exemplary embodiments of an exemplary system 500 implementing the embodiments of structure 550 for extending the field area of an RF tag reader equipped device. Structure 550 may be any of the embodiments 100, 200, 300, 400 of a structure for extending the field area of an RF tag reader equipped device, or may include variations on the embodiments described herein.

Structure 550 may used, for example, in a retail product display, in an inventory storage area, or in any other similar setting. Structure 550 may be disposed within a surface 560. Surface 560 may be, for example, a horizontal or vertical surface, or a member of a product storage or display unit such as a shelf or a sidewall of the unit. Surface 560 may alternatively be a mat that may be placed on any desired surface, such as a shelf of a product storage or display unit, or affixed to any surface thereof.

Structure 550 may be oriented such that RF tag reader coupling areas 504 of structure 550 are disposed proximate to a reader-accessible location, for example, at the front of a shelf of a product storage and display unit. Tag coupling areas 508 may then be disposed at locations distal to the reader-accessible location or outside the field area of the RF tag reader. A plurality of tag coupling areas 508 may be disposed at desired locations, and products 570 may then be placed at discrete locations on the product storage or display unit such that tags 510 of products 570 are within the range of tag coupling areas 508. Alternatively, a transmission line 509 may extend from the RF tag reader coupling areas 504 to a location distal from the reader-accessible location, and products 570 may be placed along the length of transmission line 509 such that tags 510 of products 570 are within the range of transmission line 509.

When an RF tag reader 506 is used to induce a signal in reader coupling area 504 of structure 550, the signal can be propagated to tag coupling areas 508 or along the length of transmission line 509, allowing tags 510 to be read. The RF tag reader 506 can then obtain any desired information from tags 510 of products 570, and can also ascertain the presence or absence of a tag 510 at a particular tag coupling area 508. The effective read range of the RF tag reader can thus be extended from the near field such that tags which are located distal to the reader can be identified and read.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A structure for extending a field area of a device equipped with an RF tag reader, comprising:
   at least one reader coupling area for inductively coupling with the RF tag reader in which the at least one reader coupling area is a coil of conductive material; and
   at least one tag coupling area for coupling with an RF tag, the at least one tag coupling area including a coil of conductive material of the RF tag;
   wherein the tag coupling area is disposed outside the field area of the RF tag reader;
   a negative resistance conductively coupled to and disposed in series with the at least one reader coupling area and the at least one tag coupling area such that the negative resistance has a capacitance which resonates with a total inductance of the structure; and
   the reader coupling area is conductively coupled to the tag coupling area such that a signal induced in the reader coupling area by the RF reader creates a signal in the tag coupling area, thereby inducing a signal in the tag, and allowing the RF reader to communicate with the tag further.

2. The structure of claim 1, wherein the tag coupling area is a coil.

3. The structure of claim 1, wherein the tag coupling area is a transmission line.

4. The structure of claim 1, wherein the negative resistance further comprises:
   a transistor;
   a direct current block;
   at least one feedback capacitor;
   a power source; and
   at least one resistor.

5. The structure of claim 1, wherein the negative resistance is set so as to prevent oscillation of the signal in the structure.

6. A system for extending a field area of a device equipped with an RF tag reader, comprising:
   a surface; and
   at least one structure for extending the field area of a device equipped with the RF tag reader, the structure comprising at least one reader coupling area for coupling with an RF tag reader, the at least one reader coupling area being conductively coupled to at least one tag coupling area for inductively coupling with an RF tag wherein the at least one reader coupling area is not a part of the RF tag;
   a negative resistance conductively coupled to and disposed in series with the at least one reader coupling area and the at least one tag coupling area such that the negative resistance has a capacitance which resonates with a total inductance of the structure; and
   wherein the structure is disposed within the surface.

7. The system of claim 6, wherein the at least one structure is oriented such that the at least one reader coupling area is disposed proximate a reader-accessible location.

8. The system of claim 6, wherein the at least one structure is oriented such that the at least one tag coupling area is disposed outside the field area of the RF tag reader.

9. The system of claim 6, wherein the surface is a shelf of a product storage or display unit.

10. The system of claim 6, wherein the surface is a wall of a product storage or display unit.

11. The system of claim 6, wherein the surface is a mat.

12. A method for reading an RF tag disposed outside a field area of a device equipped with an RF tag reader, comprising:
   providing at least one RF tag reader coupling area;
   providing at least one RF tag coupling area conductively coupled to the at least one reader coupling area in which the tag coupling area is a coil and the least one tag coupling area is not a part of the RF tag;

providing a negative resistance conductively coupled to and disposed in series with the at least one reader coupling area and the at least one tag coupling area such that the negative resistance has a capacitance which resonates with a total inductance of the structure; inducing a signal in the at least one RF reader coupling area by the RF tag reader;

creating the signal in the at least one RF tag coupling area; and inducing the signal in the RF tag.

13. The method of claim 12, wherein the tag coupling area is a transmission line.

14. The method of claim 12, wherein a negative resistance is conductively coupled to and disposed in series with the at least one reader coupling area and the at least one tag coupling area.

15. The method of claim 12, wherein the at least one RF tag reader coupling area and the at least one RF tag coupling area are disposed within a surface.

16. The method of claim 15, wherein the surface is a member of a product storage or display area.

17. The method of claim 15, wherein the surface is a mat.

\* \* \* \* \*